United States Patent [19]

Yeater et al.

[11] Patent Number: 4,551,498

[45] Date of Patent: Nov. 5, 1985

[54] POLYETHER POLYURETHANE PREPOLYMERS CONTAINING FINELY DIVIDED INORGANIC PARTICLES AND CAST ELASTOMERS MADE THEREFROM

[75] Inventors: Robert P. Yeater, Moundsville; Richard S. Pantone, New Martinsville; James N. Rieck, Wheeling, all of W. Va.

[73] Assignee: Mobay Chemical Corporation, Pittsburgh, Pa.

[21] Appl. No.: 606,492

[22] Filed: May 3, 1984

Related U.S. Application Data

[63] Continuation of Ser. No. 487,657, Apr. 22, 1983, abandoned.

[51] Int. Cl.$^4$ ............................................... C08L 75/04
[52] U.S. Cl. .................................... 524/424; 252/182; 524/425; 524/431; 524/590; 524/871; 524/875; 528/64; 528/65; 528/76
[58] Field of Search ............... 524/424, 425, 431, 590, 524/871, 875; 252/182; 528/64, 65, 76

[56] References Cited

U.S. PATENT DOCUMENTS

| | | | |
|---|---|---|---|
| 3,607,822 | 9/1971 | Nishino | 260/37 |
| 3,716,502 | 2/1973 | Loew | 260/25 AY |
| 4,029,593 | 6/1977 | Schäpel et al. | 252/182 |
| 4,062,825 | 12/1977 | Watabe et al. | 260/37 N |
| 4,373,082 | 2/1983 | Kimball et al. | 528/60 |
| 4,405,752 | 9/1983 | Recker et al. | 524/847 |
| 4,438,028 | 3/1984 | Schmittmann et al. | 252/609 |

FOREIGN PATENT DOCUMENTS

| | | |
|---|---|---|
| 1123167 | 5/1982 | Canada . |
| 0005470 | 4/1979 | European Pat. Off. . |
| 138777 | 11/1979 | German Democratic Rep. . |
| 1184467 | 3/1970 | United Kingdom . |
| 1284676 | 8/1972 | United Kingdom . |
| 1442064 | 7/1976 | United Kingdom . |
| 1448928 | 9/1976 | United Kingdom . |
| 1533989 | 11/1978 | United Kingdom . |
| 2015010 | 9/1979 | United Kingdom . |

*Primary Examiner*—Maurice J. Welsh
*Attorney, Agent, or Firm*—Gene Harsh; Joseph C. Gil; Aron Preis

[57] ABSTRACT

A novel polyether polyurethane polymer comprising the reaction product of an organic diisocyanate and a linear polyhydroxyl polyether having a molecular weight of less than 8000 and from 0.01 to 1%, by weight, of finely-divided inorganic particles is described, together with a process for producing a cast elastomer by reacting this polymer with a cross-linking or chain-extending agent.

11 Claims, No Drawings

POLYETHER POLYURETHANE PREPOLYMERS CONTAINING FINELY DIVIDED INORGANIC PARTICLES AND CAST ELASTOMERS MADE THEREFROM

This application is a continuation of application Ser. No. 487,657 filed Apr. 22, 1983, now abandoned.

The present invention relates to novel polyether polyurethane prepolymers and to cast elastomers made therefrom.

BACKGROUND OF THE INVENTION

It is known to produce elastomeric polyurethane plastics by reacting linear polyhydroxyl polyethers or polyesters having molecular weights of less than 8000 with an organic diisocyanate and thereafter curing the reaction product with a cross-linking or chain-extending agent. The second step of the procedure may be accomplished by either adding the cross-linking or chain-extending agent to the reaction product and pouring or casting the resultant mixture into a mold where curing is effected with the addition of heat, or by conducting the reaction in a kneader until a friable material is obtained and then curing the material by pressing it into heated molds.

One problem associated with the use of linear polyhydroxyl polyethers is that the resultant final products have relatively poor green strength (a measure of the strength of the product upon removal from the mold). Green strength is generally evaluated by removing a test panel from a mold after a specified residence time, typically about 30 minutes, and immediately folding the panel tightly over upon itself. The folded edge is then examined for crazing or cracking and rated. Polyether-based cast elastomers often resemble sliced cheese upon removal from the mold and when folded, act in a manner one would expect of folded cheese.

It is known in the art to add various fillers to polyurethanes and polyurethane prepolymers in order to increase thixotropy (see, e.g., U.S. Pat. No. 3,607,822); to stabilize against hydrolysis (see, e.g., U.S. Pat. No. 3,716,502); and to improve tear strength (see, e.g., U.S. Pat. No. 4,062,825). Specifically, silica and other inorganic additives are known to be used as fillers in polyurethanes. Generally, however, the amounts of silica and other inorganic additives used in the art are relatively high, e.g., as high as 50 parts per 100 parts of prepolymer.

It is an object of the present invention to overcome the low green strength generally encountered with polyether-based cast elastomers.

DESCRIPTION OF THE INVENTION

The present invention is directed to a novel polyether polyurethane prepolymer and to a cast elastomer made therefrom. The elastomers produced according to the present invention exhibit substantially higher green strengths than had previously been obtained and exhibit practically no "cheezy" character.

More particularly, the present invention relates to a polyether polyurethane prepolymer comprising the reaction product of an organic diisocyanate and a linear polyhydroxyl polyether having a molecular weight of less than 8000, said diisocyanate and polyhydroxyl polyether being reacted in an isocyanate to hydroxyl equivalent ratio of from 1.1:1 to 5:1, preferably of from 1.5:1 to 3:1, said prepolymer further comprising from 0.01 to 1%, by weight, based on the weight of the reaction product, of finely-divided inorganic particles. The present invention also relates to a process for producing a cast elastomer by reacting the above-noted prepolymer with a cross-linking or chain-extending agent.

Any suitable substantially-linear polyhydroxyl polyether having a molecular weight of from about 400 generally up to about 8000, preferably of from 1000 to to 4000, may be used in the process of this invention to prepare the polyether-polyurethane prepolymer. Suitable polymers include those derived from alkylene oxides, such as ethylene oxide, propylene oxide, butylene oxide and the like. The polyhydroxyl polyether may also be prepared by the polymerization of the cyclic ethers, such as, dioxane, tetrahydrofuran and the like or by the condensation of an alkylene oxide with a glycol, such as, ethylene glycol, propylene glycol, butylene glycol, and the like. Any known process for preparing the polyhydroxyl polyethers may be used, including, for example, the process described in Kirk-Othmer, "Encyclopedia of Chemical Technology", Volume 7, pages 257 to 262, published by Interscience Publishers in 1951, or in U.S. Pat. No. 1,922,459. It is, of course, also possible to provide mixed ethers of the aforesaid alkylene oxides, with the polyhydroxyl polyethers having a propylene oxide base being preferred.

Any suitable organic diisocyanate may be used in the preparation of the polyether-polyurethane prepolymer such as, for example, aliphatic, aromatic, alicyclic, and heterocyclic diisocyanates. Examples of such suitable diisocyanates include ethylene diisocyanate, ethylidene diisocyanate, propylene diisocyanate, butylene diisocyanate, cyclopentane-1,3-diisocyanate, cyclohexylene-1,4-diisocyanate, cyclohexylene-1,2-diisocyanate, 2,4- and 2,6-toluylene diisocyanate, 4,4'-diphenylmethane diisocyanate, 2,2-diphenylpropane-4,4'-diisocyanate, p-phenylene diisocyanate, m-phenylene diisocyanate and xylylene diisocyanate. Additional examples include 1,4- and 1,5-naphthylene diisocyanate, diphenyl-4,4'-diisocyanate, azobenzene-4,4'-diisocyanate, diphenylsulfone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate and the like. It is preferred, however, that diphenylmethane-4,4-diisocyanate be used.

Any suitable chain-extending or cross-linking agent may be used, such as, for example, ethylene glycol, quinite, 1,4-butanediol, 1,6-hexanediol, 1,5-naphthylene-di-β-dihydroxy ether, hydroquinone-β-dihydroxyethyl ether, trimethylol propane, glycerine, hexanetriol, water, butylene diamine, 3,3'-dichlorobenzidine, diethylated tolylene diamine, 3,3'-dichloro-4,4'-diamino diphenylmethane, 2,5-dichlorophenylene-1,4-diamine, amino-ethyl alcohol, 3-aminochlorohexanol, p-aminophenyl-ethyl alcohol, and the like.

The present invention also requires the presence of from 0.01 to 1%, by weight, based on the amount of prepolymer, of finely divided inorganic particles. Inorganic particles useful for this purpose are known and generally used in the art as fillers. They are described, for example, in Kirk-Othmer, "Encyclopedia of Chemical Technology", Second Edition, completely revised, Volume 1, page 460, and Perry, "Chemical Engineers'-Handbook", Fifth Edition, pages 16-5 and 16-6. Specific useful inorganic materials include aluminas, such as activated alumina and activated bauxite; siliceous materials, such as zeolite, alumino-silicates, acid-treated clays, magnesia-silica gel, fuller's earth and silica gel; carbons, such as activated carbon and carbon black; iron oxides; fumed silicas (such as Cab-O-Sil); calcium carbonate; and the like. Fumed silicas are preferred. In general, the only requirement for useful additives is that they have a relatively large surface area, generally in excess of 10 m$^2$/g, and that they do not adversely affect the physical properties of the final product. Also, less abrasive materials are more desirable in order to avoid undue wear on any metering pumps and in subsequent operations. These inorganic filler particles may be added to the already-formed prepolymer or they may be added to either the polyether or the isocyanate prior to preparation of prepolymer.

Catalysts may, if desired, be used in preparing the cast elastomers of the present invention. Suitable catalysts include organic tin compounds, such as tin (II) salts of carboxylic acids, for example, tin (II) acetate, tin (II) octoate, tin (II) ethyl hexoate or tin (II) laurate, and the dialkyl tin salts of carboxylic acids, for example, dibutyl tin diacetate, dibutyl tin dilaurate, dibutyl tin maleate or dioctyl tin diacetate, either alone, or most preferably, as a complex with amidines, such as 2,3-dimethyl-3,4,5,6-tetrahydropyrimidine, 2-methyl-3-cyclohexyl-3,4,5,6-tetrahydropyrimidine, aminopyridines, aminopyrimidines, hydrazino pyridines or hydrazino pyrimidines. Synergistically-acting catalyst combinations of this type are known and have been described, for example, in German Offenlegungsschriften Nos. 2,434,185; 2,601,082; and 2,603,834. Other catalysts which may also be used include known tertiary amines, such as triethylamine, tributylamine, N-methylmorpholine, N-ethylmorpholine, N-cocomorpholine, N,N,N',N'-tetramethyl-ethylenediamine, 1,4-diaza-bicyclo-(2,2,2)-octane, N-methyl-N'-dimethylaminoethyl-piperazine, N,N-dimethylbenzylamine, bis-(N,N-diethylaminoethyl)-adipate; N,N-diethylbenzylamine, pentamethyl-diethylene triamine, N,N-dimethylcyclohexylamine, N,N,N',N'-tetramethyl-1,3-butanediamine, N,N-dimethyl-β-phenylethylamine, 1,2-dimethylimidazole or 2-methylimidazole. A preferred catalyst of this type is 1,4-diaza-bicyclo-(2,2,2)-octane. Tertiary amines having isocyanate-reactive hydrogen atoms, which include, for example, triethanolamine, triisopropanolamine, N-methyl-diethanolamine, N-ethyl-diethanolamine and N,N-dimethyl-ethanolamine may also be used as catalysts. In addition, reaction products of these compounds with alkylene oxides, such as propylene oxide and/or ethylene oxide are suitable. Silaamines having carbon-silicon bonds, as described, for example, in German Pat. No. 1,229,290 may also be used as catalysts. Examples of these compounds include 2,2,4-trimethyl-2-silamorpholine or 1,3-diethylaminomethyl-tetramethyl-disiloxane. Basic nitrogen compounds, such as tetraalkylammonium hydroxides, alkali metal hydroxides, such as sodium hydroxide, alkali metal phenolates, such as sodium phenolate, and alkali metal alcoholates, such as sodium methylate, may also be used as catalysts. Hexahydrotriazines are also suitable catalysts.

Other representatives of catalysts which may be used according to the present invention and details concerning the action of the catalysts may be found, for example, in Kunststoff-Handbuch, Volume VII, published by Vieweg and Hochtlen, Carl-Hanser-Verlag, Munich, 1966, pages 96 to 102. The catalysts are generally used in a quantity of from about 0 to 10%, by weight, and preferably from 0 to 1%, by weight, based on the quantity of the prepolymer.

The polyether-polyurethane prepolymer is prepared by reacting the polyhydroxyl polyether with an excess of an organic diisocyanate. This reaction is preferably carried out at elevated temperatures of from 50° C. to about 150° C. until all of the hydroxyl groups of the polyether have disappeared. In producing the cast elastomers, this isocyanate-terminated polyether-polyurethane prepolymer is then reacted with a chain-extending or cross-linking agent containing active hydrogen-containing groups in the molecule, according to the Zerewitinoff method, which are reactive with isocyanate groups. The resulting mixture is cast into prepared molds maintained at a temperature of from about 50° C. to about 150° C. where the final curing of the chain-extending reaction product takes place The cross-linking or chain-extending agent is added preferably in a quantity such that the excess of isocyanate groups do not entirely disappear. Thus, the chain-extending agent is used in less than the stoichiometric ratio, and preferably in such an amount that from about 0.3% to about 1% NCO groups are present in the castings mixture.

The invention is further illustrated, but is not intended to be limited by the following examples in which all parts and percentages are by weight, unless otherwise indicated.

EXAMPLES

Example 1

Fifteen hundred grams of a 2,000 molecular weight poly(oxypropylene) glycol were dried at 100° C. under vacuum for 2 hours, cooled to 50° C. under dry nitrogen, and mixed with 844 gm 4,4'-methylene bis(phenyl isocyanate). This mixture was heated to 80° C. and held for 4 hours under dry nitrogen. The resulting prepolymer was allowed to cool to 25° C., mixed with 2.34 gm fumed silica (Syloid 266), stirred vigorously for one hour under dry nitrogen, then degassed 1.5 hours at 50°–70° C. and 2 mm Hg pressure. By analysis, the prepolymer contained 9.21% NCO.

An aliquot of 14.24 gm 1,4-butanediol (at 100° C.) was added to, and mixed for 40 seconds, with 156.02 gm (at 100° C.) of the above prepolymer. The product was cast into the 6"×6"×⅛" cavity of an open-faced, heated carbon steel mold (thermostatically-controlled to 117° C., by placing it on an electrically-heated hot plate) and allowed to react 30 minutes before removal. In all the examples which follow the same mold was used. Upon removal from the mold, the elastomer was folded over on itself and the crease showed less cracking and crazing than did a control sample prepared in a similar manner, but containing no fumed silica.

Example 2

A prepolymer was prepared according to the method of Example 1, from 355.4 gm of the same polyether used in Example 1, 199.9 gm of 4,4'-methylene bis(phenyl isocyanate) and 0.55 gm of Syloid 266. By analysis, the prepolymer contained 9.4% NCO.

14.4 gm of 1,4-butanediol (at 105° C.) was added to and mixed for 45 seconds with 157.9 gm (at 105° C.) of the above prepolymer. The product was cast into the heated mold (117° C.). Upon removal, the elastomer showed good green strength, much better than a similar elastomer prepared under similar conditions from a prepolymer prepared from 354.2 gm of polyether and 199.2 gm of 4,4'-methylene bis(phenyl isocyanate), but without any fumed silica additive.

Example 3

1886.8 gm of 1000 molecular weight polytetramethylene glycol were added to 1613.2 gm of 4,4'-methylene bis(phenyl isocyanate) and held at 80° C. for 2 hours. To 300 gm of the resulting prepolymer were added 0.3 gm (0.1%, by weight, based on the prepolymer) of Syloid 266, and the resulting mixture was stirred vigorously for 30 minutes at 80° C., then degassed under full vacuum. By analysis, the prepolymer contained 10.73% NCO.

16.74 gm of 1,4-butanediol was added to and mixed for 35 seconds at 80° C. with 150 grams of the silica-modified prepolymer. The product was cast in the mold (at 117° C.) and allowed to react for 10 minutes before demolding. The resulting elastomer showed much better green strength than a similar elastomer prepared without use of the silica filler.

Example 4

16.74 gm of 1,4-butanediol was added to and mixed (at 80° C.) for 45 sec. with 150 gm of the silica-modified polymer (NCO content 10.73%) according to Example 3, which. has been stored for 2 days. The product was cast in the mold (at 118° C.) and allowed to react for 10 minutes before demolding. The resulting elastomer demolded well. See Table 1 for properties of the resulting elastomer.

EXAMPLE 5

To 300 gm of the unmodified prepolymer (which has been stored for 2 days) according to Example 3, were added 0.3 gm (0.1%) of Syloid 266 and the resulting mixture was stirred for 30 minutes, then degassed.

16.74 gm of 1,4-butanediol was added to, and mixed (at 80° C.) for 45 sec. with, 150 gm of the silica-modified prepolymer. The product was cast in the mold (at 118° C.) and allowed to react for 10 minutes before demolding. Twenty minutes after demolding, the product had good green strength. See Table 1 for properties.

Example 6

16.91 gm of a 98:2 mixture of 1,4-butanediol and diethylated tolylene diamine were added to, and mixed for 45 sec. (at 80° C.) with 150 gm of the modified prepolymer according to Example 3, which has been stored for 2 days. The product was cast in the mold (at 118° C.) and allowed to react for 10 minutes before demolding. The product demolded well, showed good green strength 20 minutes after demolding, and had no cheezy appearance. See Table 1 for properties.

Example 7

2424.43 gm of 2000 molecular weight polytetramethylene glycol were added to 1627.4 gm of 4,4'-methylene bis(phenyl isocyanate) and held at 78° C. for 1 hour and 55 minutes. By analysis, the prepolymer contained 10.95% NCO.

17.09 gm of 1,4-butanediol were added to, and mixed for 45 seconds at 80° C. with 150 gm of the above prepolymer. The product was cast into the mold (at 118° C.) and allowed to react for 10 minutes before demolding. The resulting product was weak, showed poor green strength 20 minutes after demolding and had a cheezy character. See Table 1 for properties.

Example 8

To 300 gm of the prepolymer according to Example 7 were mixed 0.3 gm (0.1%) of Syloid 266 and the resulting mixture was stirred at 80° C. for 30 minutes, then degassed.

17.09 gm of 1,4-butanediol were added to, and mixed (at 80° C.) for 45 seconds with, 150 gm of the silica-modified prepolymer. The product was cast into the mold (at 118° C.) and allowed to react for 10 minutes before demolding. The resulting elastomer showed fair green strength 20 minutes after demolding and less cheeziness than the elastomer according to Example 7. See Table 1 for properties.

Example 9

17.26 gm of a 98:2 mixture of 1,4-butanediol and diethylated tolylene diamine were added to, and mixed (at 80° C.) for 45 seconds with 150 gm of the modified prepolymer according to Example 8. The product was cast onto a plate (at 118° C.) and allowed to react for 10 minutes before demolding. The resulting elastomer showed good green strength 20 minutes after demolding and showed no cheeziness. See Table 1 for properties.

TABLE 1

| Elastomer According to | Including Inorganic Filler | Chain-Extender Employed | NCO:OH ratio | Hardness, Shore A | Hardness, Shore D | Tensile Strength MPa/psi | Modulus 100% MPa/psi | Modulus 200% MPa/psi | Modulus 300% MPa/psi | Elongation |
|---|---|---|---|---|---|---|---|---|---|---|
| Example 3 | yes | 1,4 BD | 1.03 | 94 | 50 | 5163/35.6 | 2205/15.2 | 2698/18.6 | 3698/25.5 | 392 |
| Example 4 | yes | 1,4 BD | 1.03 | 93 | 50 | 5410/37.3 | 2074/14.3 | 2640/18.2 | 3669/25.3 | 392 |
| Example 5 | yes | 1,4 BD | 1.03 | 93 | 49 | 6628/45.7 | 2016/13.9 | 2669/18.4 | 4104/28.3 | 438 |
| Example 6 | yes | 1,4 BD/DETDA | 1.03 | 92 | 50 | 5830/40.2 | 1972/13.6 | 2683/18.5 | 4220/29.1 | 392 |
| Example 7 | no | 1,4 BD | 1.03 | 90 | 48 | 4162/28.7 | 1958/13.5 | 2350/16.2 | 2872/19.8 | 417 |
| Example 8 | yes | 1,4 BD | 1.03 | 93 | 49 | 4742/32.7 | 1856/12.8 | 2291/15.8 | 2901/20.0 | 433 |
| Example 9 | yes | 1,4 BD/DETDA | 1.03 | 89 | 47 | 4540/31.3 | 1653/11.4 | 2204/15.2 | 3162/21.8 | 392 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyether polyurethane prepolymer comprising the reaction product of an organic diisocyanate and a linear poylhydroxyl polyether, said polyhydroxyl polyether having a molecular weight of less than 8000, said diisocyanate and said polyhydroxyl polyether being reacted in an isocyanate to hydroxyl equivalent ratio of from 1.1:1 to 5:1, said prepolymer further comprising finely divided inorganic particles present in an amount of from 0.01 to 1% based on the weight of said reaction product.

2. A prepolymer according to claim 1, characterized in that the polyhydroxyl polyether has a molecular weight of from 1000 to 4000.

3. A prepolymer according to claim 1, characterized in that said inorganic particles are fumed silica particles.

4. A prepolymer according to claim 1, wherein said equivalent ratio is from 1.5:1 to 3:1.

5. A process for producing a polyurethane elastomer by reacting a polyether polyurethane prepolymer with a cross-linking or chain-extending agent, characterized in that said prepolymer comprises the reaction product of an organic diisocyanate and a linear polyhydroxyl polyether, said polyhydroxyl polyether having a molecular weight of less than 8000, said diisocyanate and said polyhydroxyl polyether being reacted in an isocyanate to hydroxyl equivalent ratio of from 1.1:1 to 5:1, said prepolymer further comprising finely divided inorganic particles present in an amount of from 0.01 to 1%, by weight relative to the weight of the prepolymer.

6. A process according to claim 5, characterized in that the linear polyhydroxyl polyether has a molecular weight of from 1000 to 4000.

7. A process according to claim 5, characterized in that said inorganic particles are fumed silica particles.

8. A process according to claim 5 wherein said equivalent ratio is from 1.5:1 to 3:1.

9. A process according to claim 5, characterized in that said cross-linking or chain-extending agent comprises 1,4-butanediol.

10. A process according to claim 5, characterized in that said cross-linking or chain-extending agent comprises a mixture of 1,4-butanediol and diethylated tolylene diamine.

11. A process for producing a polyurethane elastomer by reacting a polyether polyurethane prepolymer with a cross-linking or chain-extending agent, charactrized in that said prepolymer comprises the reaction product of an organic diisocyanate and a linear polyhydroxyl polyether, said polyhydroxyl polyether having a molecular weight of less than 8000, said diisocyanate and said polyhydroxyl polyether being reacted in an isocyanate to hydroxyl equivalent ratio of from 1.1:1 to 5:1, said prepolymer further comprising finely divided inorganic particles present in an amount of from 0.01 to 1%, relative to the weight of the prepolymer, said process being carried out in the absence of any organic solvents.

* * * * *